United States Patent Office 3,190,068
Patented June 22, 1965

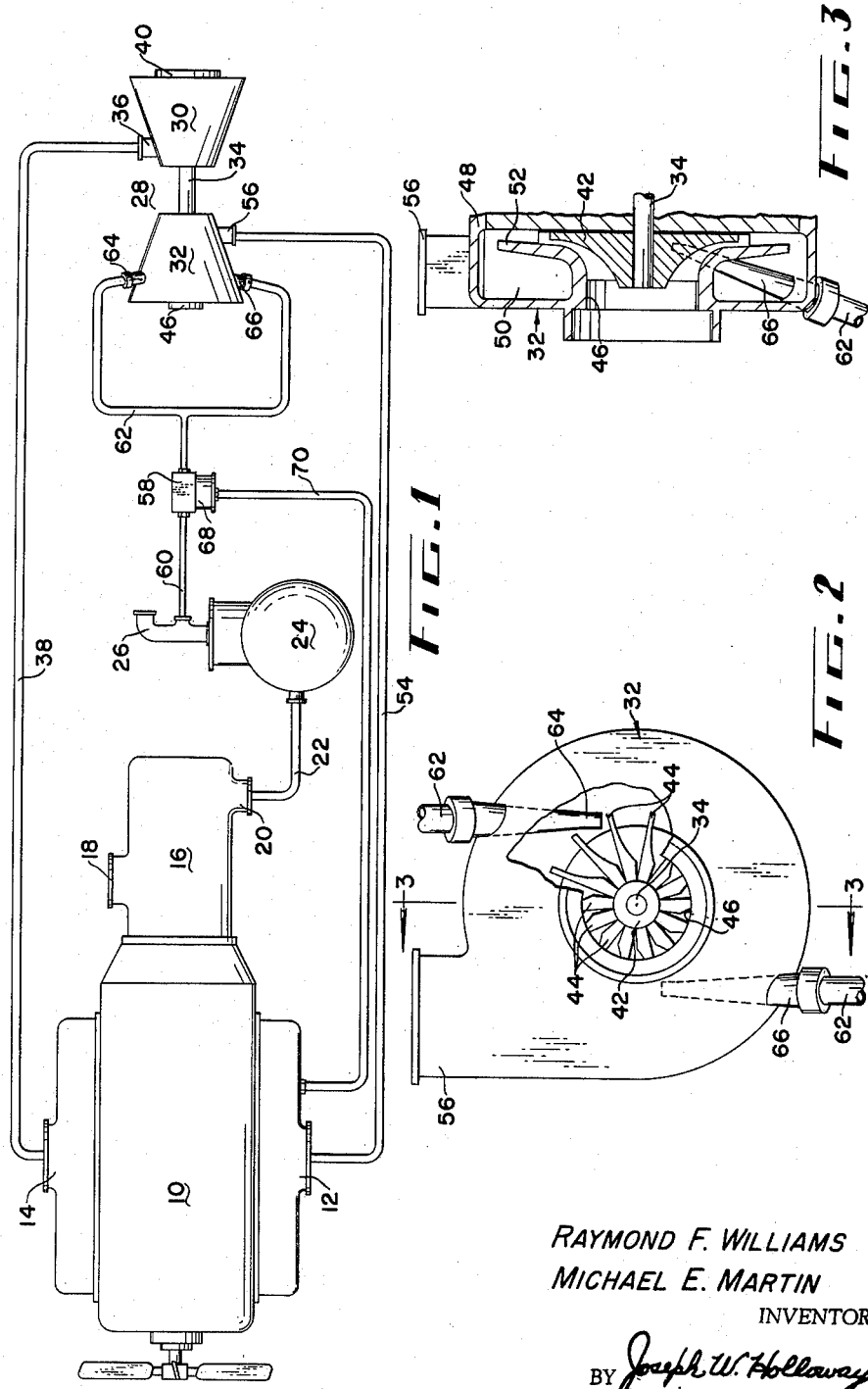

3,190,068
TURBOCHARGER FOR COMPRESSOR DRIVING ENGINE
Raymond F. Williams and Michael E. Martin, Quincy, Ill., assignors to Gardner-Denver Company, a corporation of Delaware
Filed May 14, 1964, Ser. No. 367,351
7 Claims. (Cl. 60—13)

The present invention generally pertains to improvements in exhaust-driven turbochargers of the type employed for supercharging the driving engine of an air compressor. The invention resides more particularly in the provision of means for increasing the speed and for compounding the output of turbochargers of the aforesaid type by impinging the turbocharger compressor impeller with high velocity air supplied by the engine-driven compressor.

Where a turbocharging device comprises the sole means for supplying air to the intake of an internal combustion engine, several long-standing problems arise in connection with the operation of the engine under idling conditions because the engine exhaust energy available to the turbocharger is usually quite low and therefore is insufficient to maintain the turbocharger speed and output at a satisfactory level. These problems include engine stalling at idling speed, engine stalling under conditions of increasing load requiring engine acceleration, and incomplete fuel combustion during idling and acceleration. Of course, each of the above enumerated problems can be largely obviated by increasing the engine idling speed sufficiently to supply additional energy to the turbocharger; however, with increased engine idling speed, the costs of engine operation, i.e. fuel, wear, etc., are increased accordingly. United States Patent No. 3,007,626 discloses an engine supercharging system that is somewhat related to the present invention and which contemplates supplying air directly to the engine from a compressor driven by the engine. However, this patented system provides only a partial solution to the above enumerated problems since the engine idling speed must be set considerably above the most desirable idling speed in order to operate the compressor at a speed productive of ample air to meet engine charging requirements. Accordingly, the broad object of this invention is to obviate the above enumerated problems presently encountered in the operation of turbocharged engines by the provision of improved means for increasing the output of the turbocharger without correspondingly increasing engine idling speed. A correlative object is to provide an improved turbocharging system for a compressor-driving engine which meets engine charging requirements at idling speeds which are substantially lower than can be tolerated with known turbocharging systems.

Another object is to utilize compressed air from an engine-driven compressor for charging the engine in a more efficient manner than any known heretofore.

Still another object is to compound the output of a turbocharging device for a compressor-driving engine by using air from the compressor to speed up or boost the turbocharger when the engine is idling.

For the attainment of the above generally stated objects and other more detailed objects and advantages which will hereinafter appear, the invention contemplates the provision of an exhaust-driven turbocharger having a compressor section which includes means effective during engine idling for injecting compressed air supplied by an engine-driven compressor for impingement against the impeller of the turbocharger compressor section. It is contemplated that the impinging air will maintain the impeller at a speed above that which could be maintained by engine exhaust acting alone on the turbine wheel of the turbocharger. Moreover, the impinging air will combine with the air normally drawn in by the turbocharger thereby supplementing or compounding the output air supplied by the turbocharger to the engine. Thus it will be appreciated that the present invention advantageously employs the kenetic energy as well as the added mass flow of the impeller impinging air to upgrade the performance of the turbocharger. Since this invention efficiently utilizes the kenetic energy of the air diverted from the compressor, it will be understood that less compressor air need be diverted than would be the case where the diverted compressor air is supplied directly to the engine inlet.

In the drawings:
FIG. 1 is a diagrammatic representation of the elements comprising an engine-driven compressor system embodying the present invention;
FIG. 2 is an end view of a turbocharger device having a portion broken away to illustrate a feature of the invention; and
FIG. 3 is a fragmentary sectional view taken substantially along lines 3—3 of FIG. 2.

Referring to the drawings, an internal combustion engine, generally designated by the numeral 10, is provided with an air inlet manifold 12 and an exhaust discharge manifold 14. The engine may be of the spark-ignition or the diesel type. An air compressor, designated by numeral 16, is drivably connected to the engine 10 and is provided with an inlet port 18 and a discharge port 20. The compressor may be of any well-known construction; however, a rotary type compressor is illustrated in the drawing. A conduit 22 communicates the output of compressor 16 from the compressor discharge port 20 to an air-receiver tank 24 having a service outlet pipe 26 connectable to any type of air-operated device, not shown. Any of several well-known engine throttling controls, not shown, may be employed to control the speed of the engine in response to the demand for air from the receiver 24. By using such a throttling control, the engine will operate at a preselected idling speed when no demand for air exists and the receiver pressure remains at a rated value; and, the engine will be accelerated when the air demand produces a predetermined drop in receiver pressure. When rated receiver pressure is restored, the engine will again be throttled down to idling speed.

In order to charge the intake manifold 12 with air to support combustion of fuel within engine 10, an exhaust driven turbocharger, indicated in its entirety by numeral 28, is provided. The turbocharger 28 is essentially conventional in construction and operation, with the exception of certain improvements hereinafter noted, and generally comprises a turbine section 30 driven by engine exhaust gas and a compressor section 32 drivably coupled to the turbine section 30 by a drive shaft 34. Hot exhaust gas is communicated from the engine exhaust manifold 14 to an inlet port 36 of the turbine section 30 by a line 38; and, such gas expands to drive the turbine wheel, not shown, and is thereafter exhausted to the atmosphere from a discharge port 40 of the turbine section. The shaft 34 is drivingly connected to a compressor impeller wheel 42 disposed in the compressor section 32; and, as best shown in FIG. 2, the impeller 42 is provided with a plurality of circumcentric blades 44. In a well understood manner, the impeller, upon rotation thereof by shaft 34, will draw air into an inlet port 46, defined by the compressor section casing 48, and the air will be compressed and thereafter forcibly discharged into an annular discharge chamber 50 formed by a shroud 52 and portions of the casing 48. In order to charge the engine 10 with air for combustion, compressed air from the compressor section 32 is communicated to the engine 10 by a line 54 connecting the engine inlet manifold 12 and a discharge port 56 opening from the compressor section casing 48.

With the engine operating at full speed to drive the compressor 16 to meet a demand for air from receiver 24, the turbine section 30 will be driven at maximum speed; and, accordingly, the compressor section 32 will produce a maximum output of engine-charging air. When the demand for air is interrupted, the engine speed will be reduced by the aforementioned throttling device to a preselected idling speed in order to reduce engine fuel consumption; and, it follows that, in order to minimize fuel consumption during idling periods, it is desirable to set engine idling speed as low as possible. There are, however, certain limiting factors which determine the minimum idling speed for turbocharged engines, namely, (1) avoidance of engine stalling at idling speed, (2) avoidance of engine stalling when the engine is loaded and acceleration is required, and (3) avoidance of incomplete fuel combustion and engine smoking during idling and acceleration. At a selected idling speed which will overcome the above enumerated difficulties, the energy available to the turbocharger 28 from the engine exhaust must be sufficient to maintain the speed and charging-air output of the compressor section 32 at a level which will insure substantially complete fuel combustion during idling and good engine response as the engine accelerates under load. However, it is known that the performance of conventional turbocharger devices is low at the reduced speeds usually encountered when the engine is running at the most desirable idling speed. In this regard it may be said that the turbocharger lags behind the engine in performance at low engine speeds; consequently, the engine idling speed must be set high enough to anticipate and to overcome the inherently low performance encountered in low-speed turbocharger operation. An example of the abovedescribed performance lag of turbochargers is discernable in one type of portable air compressor unit which is driven by a turbocharged diesel engine. Commonly the engine-operating speed under full load is approximately 1,800 r.p.m. and the engine idling speed must be maintained at or above approximately 1,100 r.p.m. because, at lower idling speeds, the turbocharger speed is too low to prevent stalling and smoking and engine recovery under load is poor, if not impossible.

A broad object of this invention is to upgrade the performance of the turbocharger at a given engine idling speed so that idling speed and fuel consumption may be reduced accordingly. Generally this objective is accomplished by utilizing air from the receiver 24 to increase the speed of the compressor impeller 42 and to compound the output of engine-charging air from the turbocharger during idling periods when the engine exhaust energy alone is too low to effect acceptable turbocharger performance. To this end, air from the receiver is communicated to a control valve 58 by means of line 60 and thence by means of a branched line 62 to a pair of nozzles 64 and 66 which are mounted on the housing 48. As shown in FIG. 2, the nozzles penetrate the housing in opposite directions and are disposed at opposite sides of the vertical center line of the impeller 42 and are oriented to inject air generally tangentially with respect to the outer perimeter of the impeller. The air issuing at high velocity from the nozzles impinges the outer tips of the revolving impeller blades 44 in such a manner as to increase impeller speed to a rate substantially higher than that produced by the turbine section 30 acting alone. Thus, by the use of impinging air, the speed of rotation of the impeller and the output of charging air can be controlled without sole dependence on the engine exhaust energy supplied to the turbocharger. Moreover, the impinging air supplied from the receiver is added to the air being drawn into the compressor section inlet port 46 thereby compounding the compressor section output to an even greater extent. It will be appreciated that the present invention utilizes both the kinetic energy and the mass flow of the impinging air to boost turbocharger performance; and, therefore a smaller volume of receiver air need be diverted to maintain adequate engine charging than is the case of known systems which divert receiver air directly to the engine inlet manifold. Since only a relatively small volume of receiver air need be supplied to the turbocharger to increase its speed and mass flow output, only a very slight load will be placed on the compressor and the engine in order to maintain rated receiver pressure during idling.

While the illustrated nozzles 62 and 64 provide simple and effective means for directing receiver air against the impeller blades 44 of a conventionally constructed turbocharger, it may be desirable to form a plurality of air-injecting orifices integrally with the housing member 48 and in surrounding relation with the impeller 42 for more complete and efficient utilization of the impeller driving effect of the impinging air. Moreover, the number, location, and orientation of the air-injecting means should be determined with reference to the construction and operating characteristics of the impeller 42 and to the pressure and volume of the air supplied from the receiver 24.

It has been discovered that, through the use of turbocharger boosting air in accordance with this invention, the engine idling speed may be selected without regard to the aforenoted inefficiencies of turbochargers at low operating speeds; therefore, the idling speed of the engine 10 may be set at a lower speed than would be expected considering the low exhaust energy output of the engine. For example, the portable compressor unit mentioned above may be operated at an idling speed of 900 r.p.m. instead of the usual 1,100 r.p.m. yet the improved turbocharger 28 will be operated at an increased speed which will supply sufficient charging air to avoid the aforementioned problems of stalling, smoking and poor recovery due to incomplete fuel combustion.

Since the turbocharger 28 will operate efficiently at its higher operating speeds without the expedient of impinging the impeller 42 with receiver air, suitable means are provided to determine automatically when air will be diverted from the receiver 24. Since inlet mainifold pressure provides a reliable indication of whether the turbocharger output is sufficient for good engine performance at any given engine speed, the preferred means for controlling the diversion of receiver air comprises a pressure sensitive mechanism 68, which is connected by a line 70 to the engine inlet manifold 12 for sensing inlet manifold pressure, to open the valve 58 when engine speed decreases to a preselected idling speed and to close the valve 58 when engine speed increases sufficiently to enable the turbocharger 28 to reach a speed and output which will fully meet the charging requirements of the engine 10. Since the output performance of the turbocharger 28 tends to lag behind the charging requirements of the engine 10 as the latter accelerates under load, the mechanism 68 should be operative to close the valve 58 only after the engine has accelerated to a speed somewhat greater than idling speed. If the selected idling speed is 900 r.p.m. and full engine speed is 1,800 r.p.m., for example, the mechanism 68 may be set to close valve 58 when the engine inlet manifold pressure reaches a value corresponding to an engine speed of approximately 1,400 r.p.m. for at this speed, or above, the engine exhaust will provide sufficient energy to drive the turbocharger fast enough to meet charging requirements. It will be understood that the engine inlet manifold pressures which effect opening and closing of the mechanism 68 should be selected with regard to the performance characteristics of the engine and the turbocharger used in each particular application. While a pressure switch sensitive to fluctuating engine manifold pressure has been shown in the drawing and described above, it will be understood that other performance characteristics of the engine 10 and of the turbocharger 28 may be employed to regulate the diversion of receiver air to the supercharger. For example, engine speed, engine exhaust temperature or volume, or turbocharger speed or output could be sensed by suitable devices for controlling the valve 58. Moreover, the volume of air diverted from the receiver 28 for accomplishing the objectives of this invention will necessarily vary from case to case in accordance with the characteristics of the selected turbocharger.

While the above description sets forth one practical embodiment of the invention, it will be appreciated that the invention is not limited to the disclosed embodiment. For example, the engine 10 need not be employed to drive an air compressor as a main load; instead, the engine may constitute the prime mover for a tractor or other vehicle; and, in such a case, air for speeding up the turbocharger 28 may be supplied from an auxiliary compressor device driven by the engine. In other applications of the invention, the air for impinging the turbocharger impeller 42 may be supplied by a source operated independently of the turbocharged engine. Moreover, it will be appreciated that various changes in construction, proportion and arrangement of parts may be made without departing from the spirit of the invention as set forth in the appended claims.

Having fully described the invention, what we claim as new and useful is:

1. An internal combustion engine having an exhaust-driven turbocharger providing charging gas therefor;
    said turbocharger including gas compressing means;
    a source of compressed gas;
    gas conducting means connecting said source to said gas compressing means whereby compressed gas supplied from said source operates on said gas compressing means to increase the charging-gas output of said turbocharger.

2. The invention according to claim 1 wherein said gas compressing means includes a rotary operating means for compressing charging gas, and said compressed gas operates on said operating means to rotate the same thereby increasing the charging-gas output of said turbocharger.

3. The invention according to claim 2 wherein said gas-conducting means includes air-injecting means disposed relative to said operating means for directing compressed air for impingement on said operating means.

4. The invention according to claim 3 together with means for communicating the compressed gas supplied from said source to said engine after such compressed gas has impinged said operating means as aforesaid whereby the mass flow of the charging-gas output of said turbocharger is increased by the mass flow of the air supplied from said source.

5. The invention according to claim 3 wherein said gas-conducting means includes valve means operable to control the flow of compressed gas from said source to said injecting means.

6. The invention according to claim 5 wherein said engine is provided with gas inlet means and said valve means is provided with operating means responsive to changes in gas pressure in said engine gas inlet means.

7. An internal combustion engine having air inlet means and exhaust discharge means;
    turbocharger means for said engine having a turbine section and a compressor section;
    said turbine section being rotatively driven by exhaust gas communicated thereto from said exhaust discharge means;
    air impeller means disposed in said compressor section and rotatively driven by said turbine section to provide a mass flow of air from said compressor section which is communicated to said engine air inlet means for charging said engine;
    a source of compressed air independent of said compressor section;
    air injection means disposed with respect to said impeller means to direct air from said source for impingement on said impeller to speed up the same and to compound the mass flow of air provided by said compressor section to said engine air inlet means.

References Cited by the Examiner
UNITED STATES PATENTS

| | | | |
|---|---|---|---|
| 1,955,620 | 4/34 | Buchi | 60—13 |
| 2,503,410 | 4/50 | Pouit | 60—13 |
| 2,594,845 | 4/52 | Baumann | 60—13 |
| 2,737,017 | 3/56 | Feiss. | |
| 2,773,348 | 12/56 | Grieshaber et al. | 60—13 |
| 3,007,626 | 11/61 | Simson | 230—56 |
| 3,071,122 | 1/63 | Lieberherr | 60—13 X |

RICHARD B. WILKINSON, *Primary Examiner.*

Disclaimer 3,190,068.—*Raymond F. Williams* and *Michael E. Martin*, Quincy, Ill. TURBOCHARGER FOR COMPRESSOR DRIVING ENGINE. Patent dated June 22, 1965. Disclaimer filed Nov. 7, 1968, by the assignee, *Gardner-Denver Company*.

Hereby enters this disclaimer to all claims of said patent.

[*Official Gazette April 8, 1969.*]